United States Patent
Soderstrom

(10) Patent No.: US 9,937,863 B2
(45) Date of Patent: Apr. 10, 2018

(54) FORWARD VIEWING CAMERA CONFIGURED TO CONTROL OUTSIDE ELECTRO-OPTIC MIRROR

(71) Applicant: Gentex Corporation, Zeeland, MI (US)

(72) Inventor: Joakim D. V. Soderstrom, Annelov (SE)

(73) Assignee: GENTEX CORPORATION, Zeeland, MI (US)

(*) Notice: Subject to any disclaimer, the term of this patent is extended or adjusted under 35 U.S.C. 154(b) by 220 days.

(21) Appl. No.: 14/807,991

(22) Filed: Jul. 24, 2015

(65) Prior Publication Data

US 2016/0023607 A1 Jan. 28, 2016

Related U.S. Application Data

(60) Provisional application No. 62/028,591, filed on Jul. 24, 2014.

(51) Int. Cl.
*B60R 1/08* (2006.01)
*G02F 1/163* (2006.01)

(52) U.S. Cl.
CPC .............. *B60R 1/088* (2013.01); *B60R 1/081* (2013.01); *G02F 1/163* (2013.01)

(58) Field of Classification Search
CPC .......... B60R 1/081; B60R 1/088; G02F 1/163
USPC ........................................................ 315/82
See application file for complete search history.

(56) References Cited

U.S. PATENT DOCUMENTS

| | | | |
|---|---|---|---|
| 5,424,952 A | 6/1995 | Asayama | |
| 6,587,573 B1* | 7/2003 | Stam | B60Q 1/085 340/930 |
| 7,978,393 B2 | 7/2011 | Tonar et al. | |
| 8,017,898 B2 | 9/2011 | Lu et al. | |
| 8,625,815 B2 | 1/2014 | Deline et al. | |
| 8,636,393 B2 | 1/2014 | Schofield | |
| 2003/0117728 A1* | 6/2003 | Hutzel | B60Q 3/023 359/838 |
| 2004/0164228 A1* | 8/2004 | Fogg | B60Q 1/1423 250/208.1 |
| 2005/0012604 A1* | 1/2005 | Takahashi | G01S 13/931 340/435 |

(Continued)

OTHER PUBLICATIONS

International Search Report and Written Opinion of the International Searching Authority dated Oct. 22, 2015 for International Application No. PCT/US2015/041971, filed Jul. 24, 2015.

*Primary Examiner* — Dylan White
(74) *Attorney, Agent, or Firm* — Price Heneveld LLP; Bradley D. Johnson

(57) ABSTRACT

A system for controlling a dimming function of a display element of a host vehicle is disclosed. The system comprises a display element configured to provide a rearward view from the host vehicle and a sensor directed forward relative to the host vehicle. A controller is in communication with the sensor and the display element. The controller is configured to identify a taillight of a detected vehicle from data received from the sensor. Based on the data received from the sensor, the controller calculates a passing period for the host vehicle to pass the detected vehicle. Based on the passing period the controller adjusts a display property of the display element to limit a glare displayed by the display element.

20 Claims, 4 Drawing Sheets

(56) References Cited

U.S. PATENT DOCUMENTS

| | | |
|---|---|---|
| 2009/0201137 A1 | 8/2009 | Weller et al. |
| 2012/0099173 A1 | 4/2012 | Gentry et al. |
| 2012/0120239 A1 | 5/2012 | Hutzel et al. |
| 2013/0148063 A1* | 6/2013 | Maeda ............... B60R 1/12 349/114 |
| 2014/0211013 A1 | 7/2014 | Drummond et al. |
| 2015/0042801 A1* | 2/2015 | Lee ............... B60Q 1/143 348/148 |

* cited by examiner

US 9,937,863 B2

FORWARD VIEWING CAMERA CONFIGURED TO CONTROL OUTSIDE ELECTRO-OPTIC MIRROR

CROSS REFERENCE TO RELATED APPLICATION

This Application claims priority of U.S. Provisional Application No. 62/028,591, filed on Jul. 24, 2014, and the entirety of which is incorporated by reference herein.

TECHNOLOGICAL FIELD

The present disclosure relates generally to a vehicle display system and more particularly relates to a rearview display system.

SUMMARY

In one aspect of the present disclosure, a system for controlling a dimming function of a display element of a host vehicle is disclosed. The system comprises a display element configured to provide a rearward view from the host vehicle and a sensor directed forward relative to the host vehicle. A controller is in communication with the sensor and the display element. The controller is configured to identify a taillight of a detected vehicle from data received from the sensor. Based on the data received from the sensor, the controller calculates a passing period for the host vehicle to pass the detected vehicle. Based on the passing period the controller adjusts a display property of the display element to limit a glare displayed by the display element.

In another aspect of the present disclosure, an apparatus for controlling a dimming function of a display element of a host vehicle is disclosed. The apparatus comprises a display element configured to provide a rearward view from the host vehicle and a sensor configured to monitor a blind spot of the host vehicle. A controller is in communication with the sensor and the display element. The controller is configured to identify a detected vehicle from data received from the sensor. Based on a change in position of the detected vehicle in the data, the controller is configured to calculate a passing period for the host vehicle to pass the detected vehicle. Based on the passing period, the controller adjusts a display property of the display element to limit a glare displayed by the display element.

In yet another aspect of the present disclosure, a method of adjusting a brightness of a display element for a host vehicle is disclosed. The method comprises identifying a taillight of a detected vehicle from data received from an image sensor. Based on a change in the data received from the image sensor, a passing period is calculated for the host vehicle to pass the detected vehicle. The method further adjusts a display property of the display element based on the passing period to limit a glare displayed by the display element.

These and other features, advantages, and objects of the present device will be further understood and appreciated by those skilled in the art upon studying the following specification, claims, and appended drawings.

DETAILED DESCRIPTION OF EMBODIMENTS

Figure 1:
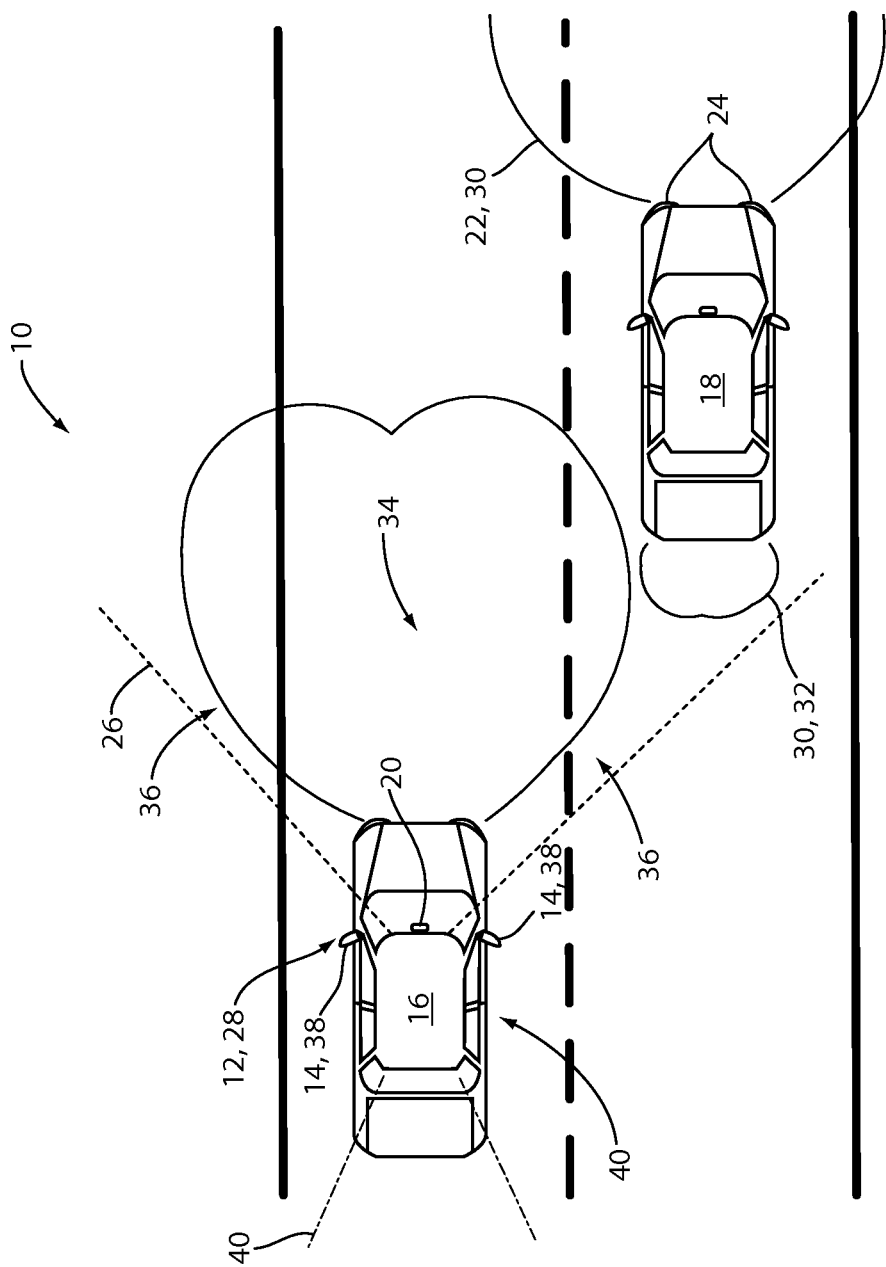
FIG. 1 is an environmental view of a host vehicle configured to utilize data from a forward facing sensor to control an electro-optic mirror.

For purposes of description herein the terms "upper," "lower," "right," "left," "rear," "front," "vertical," "horizontal," and derivatives thereof shall relate to the device as oriented in FIG. 1. However, it is to be understood that the device may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 2:
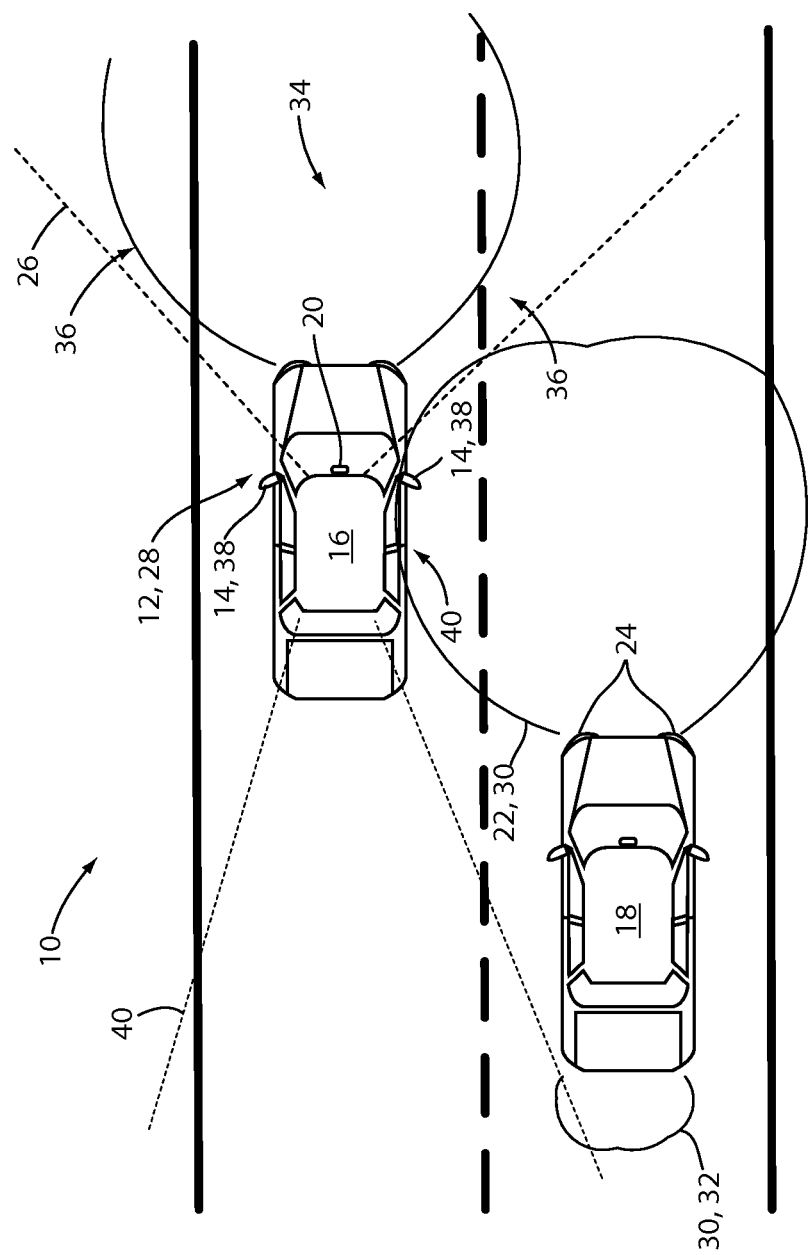
FIG. 2 is an environmental view of a host overtaking a detected vehicle.

Referring to FIGS. 1 and 2, an operating environment 10 for a system 12 configured to control a dimming function of a display element 14 of a host vehicle 16 is shown. The system 12 is incorporated in the host vehicle 16 and is configured to adjust the brightness and/or reflectivity of the display element 14 in response to a change in a position of a detected vehicle 18 relative to the host vehicle 16. In some implementations, the system 12 may utilize an image sensor 20 having a forward facing field of view relative to the host vehicle 16 to identify the change in position of the detected vehicle 18. The system 12 may also utilize at least one sensor configured to monitor a blind spot of the host vehicle 16 to determine the change in position of the detected vehicle 18.

The display element 14 may comprise any form of display device configured to provide a view to an occupant of the vehicle. For example, the display element may be one of a rearview display, a vehicle mirror, an interior or exterior vehicle mirror, etc. In an exemplary implementation, the display element may comprise a side mirror or display configured to provide a rearward directed view from the host vehicle 16 to an operator of the host vehicle 16.

In various implementations, the disclosure may provide for predicting a timing of an intersection of a headlight emission 22 from a headlight 24 of the detected vehicle 18 with the display element 14. The intersection may correspond to a timing at which the display element 14 of the host vehicle 16 passes or overtakes the detected vehicle 18 such that the headlight emission 22 is directed toward the display element 14 as demonstrated in FIG. 2. Based on the predicted timing of the intersection of the headlight emission 22, the system is operable to adjust brightness and/or reflectivity of the display element 14. By adjusting the brightness and/or reflectivity of the display element 14, the system 12 ensures that glare light corresponding to the headlight emission 22 is limited to avoid blinding or distracting an operator of the host vehicle 16.

Referring to FIG. 1, the host vehicle 16 is shown approaching the detected vehicle 18. The image sensor 20 is configured to have a field of view 26 directed forward relative to the host vehicle 16 and is in communication with a controller 28. As the host vehicle 16 approaches the detected vehicle 18, the controller 28 is configured to identify at least one light emission 30 from the detected vehicle 18 based on data received from the image sensor 20. The at least one light emission 30 may correspond to the headlight emission 22 and/or a taillight emission 32. Though described in reference to a light emission, an identified feature of the detected vehicle 18 may include any vehicle feature, for example, the at least one light emission 30, a vehicle panel, a wheel or tire, or any portion of the detected vehicle 18.

In response to the identification of the at least one light emission 30, the controller 28 is configured to calculate a timing at which the glare light emitted from the detected vehicle 18 will intersect or radiate into the display element 14. The intersection of the glare light may correspond to a timing or duration that a glare light corresponding to the headlights 24 may be projected toward an operator or occupant of the host vehicle 16. The timing of the intersection may be calculated by identifying at least one feature of the detected vehicle 18 in the data from the image sensor 20 to determine a rate of change of the feature in the data. The rate of change may be determined based on movement of the at least one feature in the data over time.

Referring to FIG. 2, as the host vehicle 16 approaches and overtakes the detected vehicle 18, the data from the image sensor 20 changes due to a change in position of the detected vehicle 18 relative to the host vehicle 16. For example, as the host vehicle 16 approaches the detected vehicle 18, the headlight emission 22, and the taillight emission 32 from the detected vehicle 18 will move from a central portion 34 of the field of view 26 outward toward an edge portion 36 of the field of view 26. The change in position of the at least one light emission 30 may be communicated from the image sensor 20 to the controller 28 in the form of image data demonstrating the change in position over time. Based on a rate of change of the motion of the at least one light emission 30, the controller 28 is configured to adjust the brightness and/or reflectivity of the display element 14.

The display element 14 may be implemented as a display screen, an electro-optic mirror (e.g. an electrochromic (EC) mirror element), or any other form of display. In an exemplary implementation, the display element 14 may comprise an EC mirror element 38. In operation, the controller 28 is configured to change the reflectivity of the EC mirror element 38 based on the image data received from the image sensor 20. The controller 28 is configured to predict a timing at which the headlight emission 22 of the detected vehicle 18 will intersect the EC mirror element 38 corresponding to a passing side 40 of the host vehicle 16. Based on the predicted timing, the controller 28 is configured to limit or decrease the reflectivity of the EC mirror element 38 such that glare light corresponding to the headlight emission 22 is attenuated as it is reflected to the operator of the host vehicle 16.

As discussed herein, the controller 28 may predict the timing of the intersection of the headlight emission 22, with the display element 14 based on a rate of change of at least one light emission 30 corresponding to the detected vehicle 18. Additionally, the controller 28 may be configured to predict the timing of the intersection of the headlight emission 22 based on a change in size of the at least one light emission over time. For example, the representation of the at least one light emission 30 in the image data may increase in size as the host vehicle 16 approaches the detected vehicle 18. Based on the relative size of the representation of at least one light emission 30, the controller may predict the timing of the intersection of the headlight emission 22 such that the glare light is limited.

In some implementations, the controller 28 may also predict the timing of the intersection of the headlight emission 22 based on the relative proportions of the headlight emission 22 and the taillight emission 32. For example, as the host vehicle 16 approaches the detected vehicle 18, an emission from each of the taillights corresponding to the taillight emission 32 may appear to spread apart such that a distance between each of the taillights increases in the image data. Similarly, a distance between the headlight emission 22 and the taillight emission 32 may also increase in the image data in response to the host vehicle 16 approaching the detected vehicle 18. The relative size, distances, and proportions, as well as various rates of change thereof, of the at least one light emission 30 are utilized by the controller 28 to predict and control the reflectivity of the EC mirror element 38. In this way, glare light corresponding to the headlight emission 22 from the detected vehicle 18 may be limited by decreasing the reflectivity of the EC mirror element 38 prior or corresponding to the intersection of the headlight emission 22 with the EC mirror element 38.

The various implementations of the disclosure may provide for systems and methods of controlling a display element to predict a glare light condition of an outside display element (e.g. display element 14). The disclosed systems and methods provide various benefits including a prediction of a glare light condition. The disclosure provides for a novel approach to predict a timing of an intersection of a headlight emission with an outside display element utilizing a sensor having a forward directed field of view. The disclosure may provide for various benefits including increased safety and system response in adjusting brightness and/or reflectivity of the outside display element that may not be possible by utilizing a sensor having a rear facing field of view 40.

Figure 3:
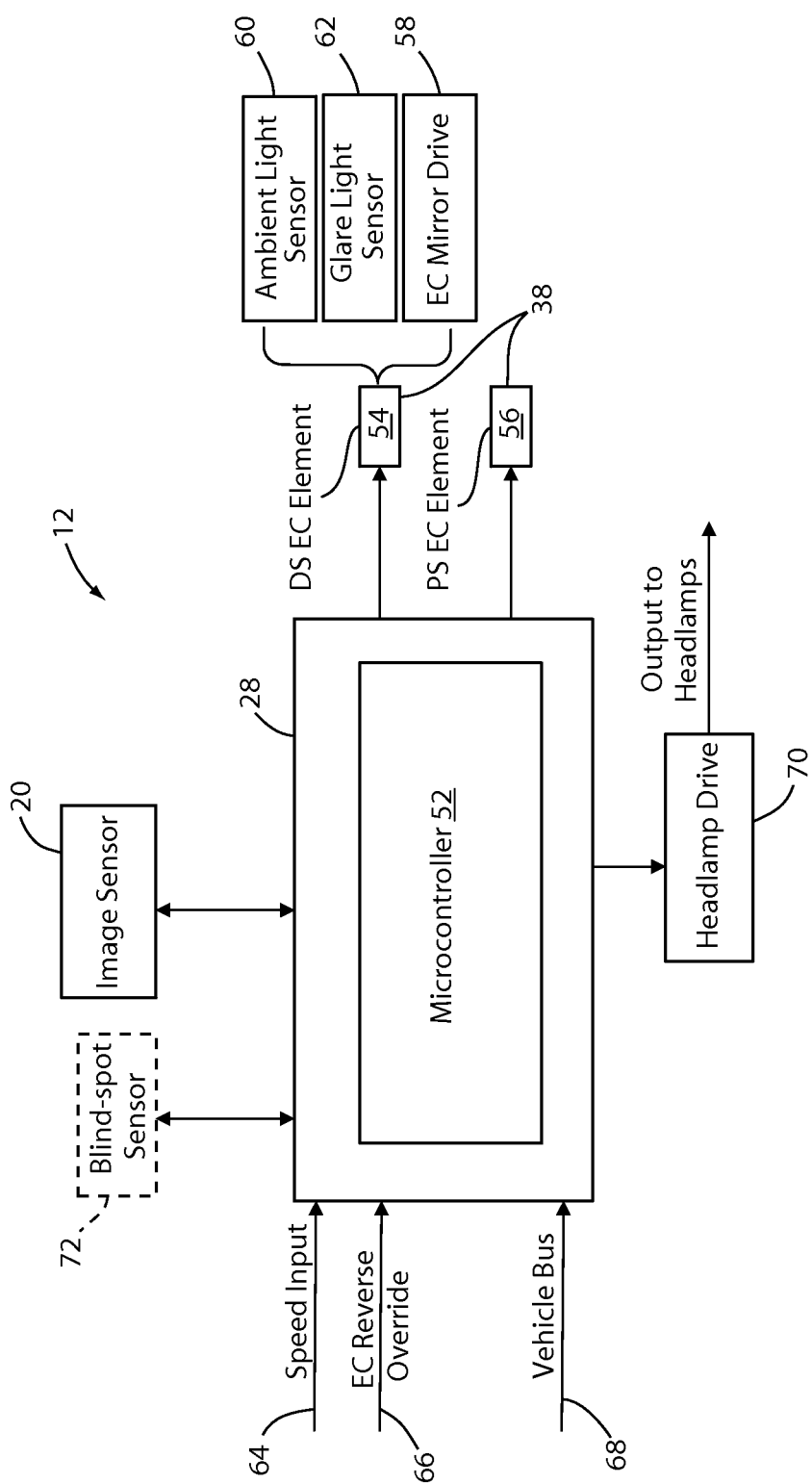
FIG. 3 is a block diagram of a controller configured to control an electro-optic mirror.

Referring to FIG. 3, a block diagram of the controller 28 is shown. The image sensor 20 is in electrical communication with the controller 28 which comprises a microcontroller 52. The microcontroller 52 is configured to receive image data from the image sensor 20. The microcontroller 52 is further configured to process images corresponding to the image data and generated output signals. The controller 28 may be mounted in a vehicle accessory, such as a sun visor, overhead console, center console, dashboard, prismatic rearview mirror, A-pillar, or at any other suitable location in the vehicle 16. The controller 28 and the microcontroller 52 can be implemented using a microcontroller, a microprocessor, a digital signal processor, a programmable logic unit, a discrete circuitry, or any combination thereof. Additionally, the microcontroller may be implemented using more than one microprocessor.

The controller 28 is in communication with at least one display element, for example the EC mirror element 38. The controller 28 may further be in communication with a driver side EC mirror element 54 in a passenger side EC mirror element 56. The controller 28 is configured to output a control signal configured to adjust the reflectivity of the EC mirror element 38 by controlling the EC mirror drive 58. In this way, the controller 28 is operable to limit the glare light projected to the operator of the host vehicle 16 from the headlights 24 of the detected vehicle 18.

Each of the EC mirror elements 38 may comprise an ambient light sensor 60 and a glare light sensor 62. These sensors, as well as the image sensor 20 are in communication with the controller 28 and may be implemented as digital photodiode light sensors as described in U.S. patent application Ser. No. 09/307,191 entitled "PHOTODIODE LIGHT SENSOR," filed Jan. 25, 2000, now U.S. Pat. No.

6,359,274, and U.S. patent application Ser. No. 09/491,192 entitled "VEHICLE EQUIPMENT CONTROL WITH SEMICONDUCTOR LIGHT SENSORS," filed May 7, 1999, now U.S. Pat. No. 6,379,013, the disclosures of which are incorporated herein by reference. The ambient light sensor 60 and glare light sensor 62 may be utilized in combination with the image sensor 20 to provide additional data to identify additional glare light conditions, for example the detection of a detected vehicle approaching the host vehicle 16 from the rear.

The EC mirror drive 58 may be implemented the drive circuit described in U.S. Pat. No. 5,956,012, entitled "SERIES DRIVE CIRCUIT," filed by Robert R. Turnbull et al. on Sep. 16, 1997, and PCT Application No. PCT/US97/16946, entitled "INDIVIDUAL MIRROR CONTROL SYSTEM," filed by Robert C. Knapp et al. on Sep. 16, 1997; and U.S. patent application Ser. No. 09/236,969, entitled "AUTOMATIC DIMMING MIRROR USING SEMICONDUCTOR LIGHT SENSOR WITH INTEGRAL CHARGE COLLECTION," filed May 7, 1999, by Jon H. Bechtel et al., now abandoned, the disclosures of which are incorporated herein by reference thereto. In response to the control signal from the controller 28, the EC mirror drive 58 may adjust the reflectivity of the EC mirror elements 38 by adjusting a current to the EC mirror elements 38.

In order to predict the timing of the intersection of the at least one headlight 24 with the display element 14, the controller 28 may further utilize various input signals corresponding to the operating conditions of the host vehicle 16. A speed input 64 provides vehicle speed information to the controller 28. The speed input 64 may be utilized by the controller 28 in addition to the image data received from the image sensor 20 predict the timing of the intersection of the headlight emission 22 intersecting with the display element 14, for example the passenger side EC element 56.

Additional inputs may also be provided to the controller 28 including a reverse signal 66. The reverse signal 66 may provide information to notify the controller 28 that the host vehicle 16 is in reverse. If the host vehicle 16 is in reverse, the controller 28 clears or increases reflectivity of the EC mirror element 38 to provide a clear view rearward from the host vehicle 16. The controller may further be in communication with a vehicle bus 68. The vehicle bus 68 may be implemented using any suitable standard communication bus, such as a Controller Area Network (CAN) bus. The vehicle bus 68 may be configured to provide a variety of information to the controller 28.

In some implementations, the system 12 may further be implemented in combination with a headlamp drive 70 configured to control low beam headlamps and high beam headlamps of the host vehicle 16. In such embodiments, the microcontroller 52 is configured to output signals to the headlamp drive 70 to control the low beam headlamps and the high beam headlamps. The image data from the image sensor 20 may provide additional information corresponding to the operating environment of the host vehicle 16, such that the controller 28 may adjust the headlamps the host vehicle via the headlamp drive 70. At least one implementation of a headlight control system is taught in U.S. Pat. No. 6,049,171, entitled "CONTINUOUSLY VARIABLE HEADLAMP CONTROL," filed by Joseph Stam et al. on Sep. 18, 1998, the disclosure of which is incorporated herein by reference.

In some implementations, the controller 28 may further be in communication with a plurality of blind spot sensors 72. The blind spot sensor 72 may be utilized in some embodiments of the disclosure to provide for data for identifying the detected vehicle 18 and in predicting the intersection of the headlight emission 22 with the display element 14. The blind spot sensors 72 may be an infrared blind spot detection system of the type disclosed in U.S. Provisional Application Ser. No. 60/013,941, filed Mar. 22, 1996, by Kenneth Schofield entitled "PROXIMITY DETECTION OF OBJECTS IN AND AROUND A VEHICLE," the disclosure of which is hereby incorporated by reference, or International Patent Application No. WO 9525322 A1, published Sep. 21, 1995, by Patchell et al., entitled "VEHICLE-MOUNTED DETECTOR TO SENSE MOVING VEHICLE IN BLIND SPOT"; an optical blind spot detection system of the type disclosed in U.S. Pat. No. 5,424,952 (Asayama); a radar-based blind spot detection system of the type disclosed in U.S. Pat. No. 5,325,096 (Pakett); an ultrasonic blind spot detection system of the type disclosed in U.S. Pat. No. 4,694,295 (Miller et al.); or any other of the known types of blind spot detection systems. The blind spot sensors 72 may be incorporated in exterior mirrors corresponding to each of the EC mirror elements 38. The blind spot detectors may also be independently positioned on a driver side and passenger side of the host vehicle 16.

Figure 4:
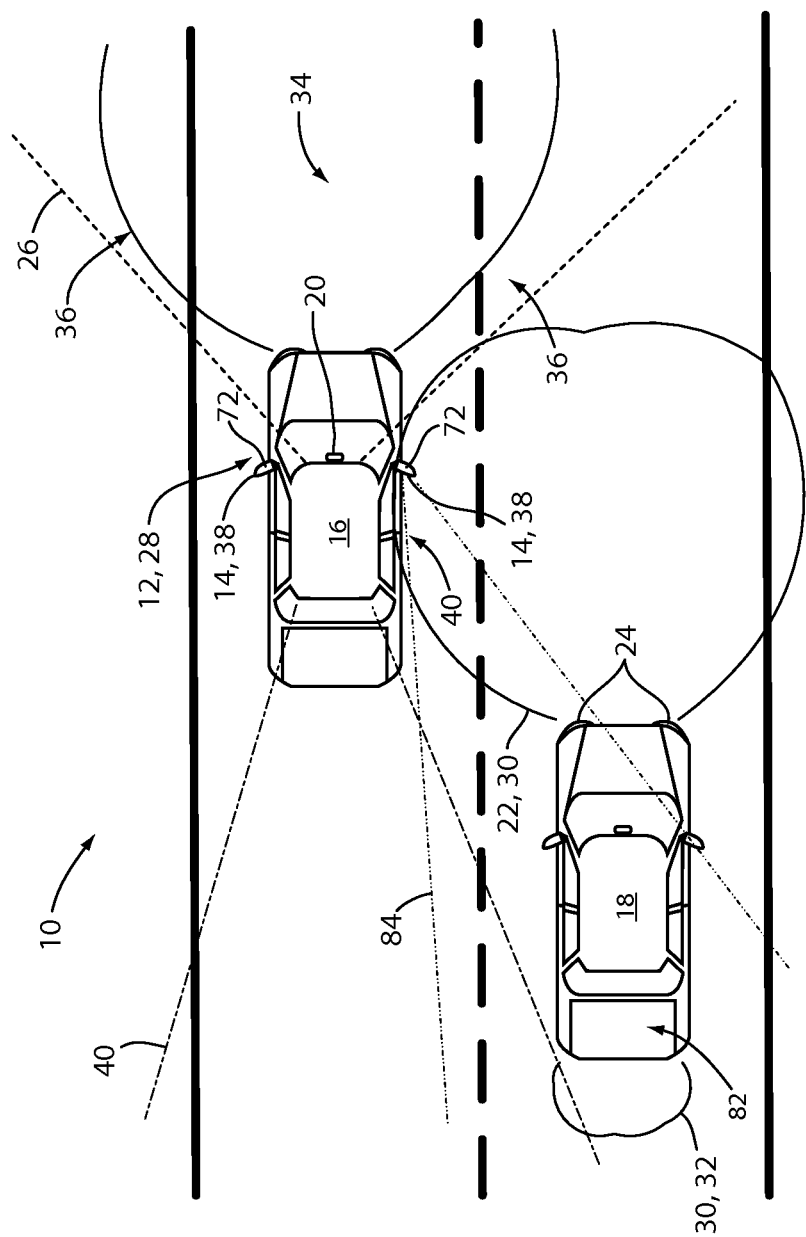
FIG. 4 is an environmental view of a host vehicle configured to utilize data from a blind-spot sensor to control an electro-optic mirror.

Referring now to FIG. 4, an implementation of the system 12 incorporating the blind spot sensors 72 is shown. The controller 28 may be configured to receive one or more signals from the blind spot sensors 72 to allow the controller 28 to predict the timing of the intersection of the headlight emission 22 with the EC mirror element 38. A blind spot sensor 72 may be disposed on each of side of the host vehicle 16 to provide information to the controller 28 to identify a presence of the detected vehicle 18. In this example, the detected vehicle 18 is shown located proximate the passenger side 40 of the host vehicle 16. Information from the blind spot sensors 72 may be utilized in combination with the image sensor 20 and in some implementations, may be utilized independent of the image sensor 20 predict the timing of the intersection of the headlight emission 22 with the EC mirror element 38.

For example, in addition to the data provided to the controller 28 from the image sensor 20, blind spot data may be provided by at least one blind spot sensor 72 to identify a portion of the detected vehicle 18 entering the blind spot of the host vehicle 16. The blind spot data may incorporate presence detection and/or images corresponding to the detected vehicle 18 to assist the controller in accurately predicting the intersection of the headlight emission 22 with the EC mirror element 38. The blind spot data may be utilized by the controller 28 to verify that an initial predicted timing of the intersection is calculated accurately by verifying a timing of at least one feature (e.g. at least one light emission 30) in the blind spot data.

The blind spot sensor 72 may also be utilized independent of the image sensor 20 to predict the timing of the intersection of the headlight emission 22 with the EC mirror elements 38. For example, as the host vehicle 16 approaches the detected vehicle 18, a rear portion 82 may initially enter a blind spot field of view 84 of the blind spot sensor 72. As the host vehicle 16 passes the detected vehicle 18, blind spot data from the blind spot sensor 72 is communicated to the controller 28. In some implementations, the blind spot data may comprise image data and/or presence data corresponding to the detected vehicle 18. In response to receiving the image data corresponding to the detected vehicle 18, the controller 28 is operable to identify at least one light emission 30 (e.g. the taillight emission 32) to predict the timing of the intersection.

The disclosure provides various methods and systems operable to predict and/or detect a timing of an intersection of a headlight emission with a display element (e.g. an outside EC mirror element) of a vehicle. Based on the predicted timing of the intersection, the systems are operable to adjust the brightness and/or reflectivity of the display elements to limit a glare light projected into the eyes of a vehicle operator. The various implementations of the system provide for advance controls to improve the safety and operation of any vehicle incorporating a display element.

It will be understood that any described processes or steps within described processes may be combined with other disclosed processes or steps to form structures within the scope of the present device. The exemplary structures and processes disclosed herein are for illustrative purposes and are not to be construed as limiting.

It is also to be understood that variations and modifications can be made on the aforementioned structures and methods without departing from the concepts of the present device, and further it is to be understood that such concepts are intended to be covered by the following claims unless these claims by their language expressly state otherwise.

The above description is considered that of the illustrated embodiments only. Modifications of the device will occur to those skilled in the art and to those who make or use the device. Therefore, it is understood that the embodiments shown in the drawings and described above is merely for illustrative purposes and not intended to limit the scope of the device, which is defined by the following claims as interpreted according to the principles of patent law, including the Doctrine of Equivalents.

What is claimed is:

1. A system for controlling a dimming function of a display element configured to provide a rearward view from a host vehicle, the system comprising:
    a sensor directed forward relative to the host vehicle; and
    a controller in communication with the sensor and the display element, wherein the controller is configured to:
        identify a taillight of a detected vehicle from data received from the sensor;
        calculate a passing period for the host vehicle to pass the detected vehicle based on a change in the data received from the sensor; and
        adjust a display property of the display element based on the passing period to limit a glare displayed by the display element.

2. The system according to claim 1, wherein the sensor comprises an image sensor.

3. The system according to claim 2, wherein the passing period is determined based on image data received from the image sensor by identifying at least one of a change in position of the taillight, a change in size of the taillight, and a change in proportion of the taillight in the image data.

4. The system according to claim 3, further comprising:
    a speed input configured to communicate a speed of the host vehicle with the controller.

5. The system according to claim 4, wherein the controller utilizes the speed of the host vehicle in addition to the image data to calculate the passing period.

6. The system according to claim 1, wherein the display property corresponds to a brightness of the display element.

7. The system according to claim 6, wherein the brightness is controlled by adjusting a reflectivity of the display element.

8. The system according to claim 1, wherein the display element corresponds to an outside mirror of the vehicle.

9. The system according to claim 8, wherein the outside mirror comprises an electrochromic mirror.

10. An apparatus for controlling a dimming function of a display element configured to provide a rearward view from the host vehicle, the apparatus comprising:
    a sensor configured to monitor a blind spot of the host vehicle;
    a controller in communication with the sensor and the display element, wherein the controller is configured to:
        identify a detected vehicle from data received from the sensor;
        calculate a passing period for the host vehicle to pass the detected vehicle based on a change in the data received from the sensor;
        based on the passing period, adjust a display property of the display element to limit a glare displayed by the display element.

11. The apparatus according to claim 10, wherein the property of the display element is adjusted prior to an intersection of a headlight emission with the display element.

12. The apparatus according to claim 11, wherein the property is adjusted prior to the intersection by predicting the intersection based on the passing period.

13. The apparatus according to claim 10, wherein the controller is configured to adjust the property prior to the glare intersecting the display element.

14. The apparatus according to claim 10, wherein the property corresponds to a reflectivity of the display element.

15. The apparatus according to claim 10, wherein the display element corresponds to an electrochromic mirror.

16. A method of adjusting a brightness of a display element for a host vehicle, the method comprising:
    identifying a taillight of a detected vehicle from data received from a sensor;
    calculating a passing period for the host vehicle to pass the detected vehicle based on a change in the data received from the sensor; and
    adjusting a display property of the display element based on the passing period to limit a glare displayed by the display element.

17. The method according to claim 16, wherein calculating the passing period is determined by identifying at least one of a change in position of the taillight, a change in size of the taillight, and a change in proportion of the taillight in the image data.

18. The method according to claim 16, further comprising:
    receiving image data from the sensor to identify the taillight.

19. The method according to claim 18, further comprising:
    receiving a speed input of the host vehicle comprising speed data.

20. The method according to claim 19, wherein the passing period is calculated based on the image data and the speed data.

* * * * *